United States Patent [19]

Berner

[11] Patent Number: 4,547,254

[45] Date of Patent: Oct. 15, 1985

[54] APPARATUS FOR BONDING SHEET MATERIAL

[75] Inventor: Kurf Berner, Obermuhen, Switzerland

[73] Assignee: Ecoboard Limited, Saint Helier, Jersey, Channel Islands

[21] Appl. No.: 422,740

[22] Filed: Sep. 24, 1982

[30] Foreign Application Priority Data

Oct. 22, 1981 [CH] Switzerland .......................... 6756/81

[51] Int. Cl.[4] ............................................ B32B 31/12
[52] U.S. Cl. ..................... 156/555; 100/153; 100/154; 118/225; 156/324
[58] Field of Search ................. 100/153, 154; 118/216, 118/225; 156/324, 555, 583.5

[56] References Cited

U.S. PATENT DOCUMENTS

| | | | |
|---|---|---|---|
| 1,504,218 | 8/1924 | Crowell . | |
| 2,554,988 | 5/1951 | Hollis ................ | 100/154 X |
| 2,566,249 | 8/1951 | Rainey et al. .................. | 156/324 X |
| 3,690,981 | 9/1972 | DiFrank et al. ................ | 156/336 X |
| 4,198,446 | 4/1980 | Goetz ................. | 118/225 X |
| 4,290,837 | 9/1981 | Bova .................. | 156/324 X |

FOREIGN PATENT DOCUMENTS 1214821  4/1960  France .
 444652  3/1936  United Kingdom .

*Primary Examiner*—Robert A. Dawson
*Attorney, Agent, or Firm*—Flehr, Hohbach, Test, Albritton & Herbert

[57] ABSTRACT

Three paperboard webs are glued to one another with as little expenditure of energy as possible. After leaving the gluing apparatus, the finished sheets cut to size are ready for shipment. The middle paperboard web is passed through between two steel rolls which apply glue homogeneously to both sides of the web. High linear pressure is produced in the region of the generatrices of the steel rolls respectively touching the web. Such pressure is necessary in order that a highly viscous polymeric synthetic or natural adhesive, preferably with a solids content of more than 50%, can be used. No special drying facilities are needed, and the water-soluble glue allows recycling without problems.

6 Claims, 5 Drawing Figures

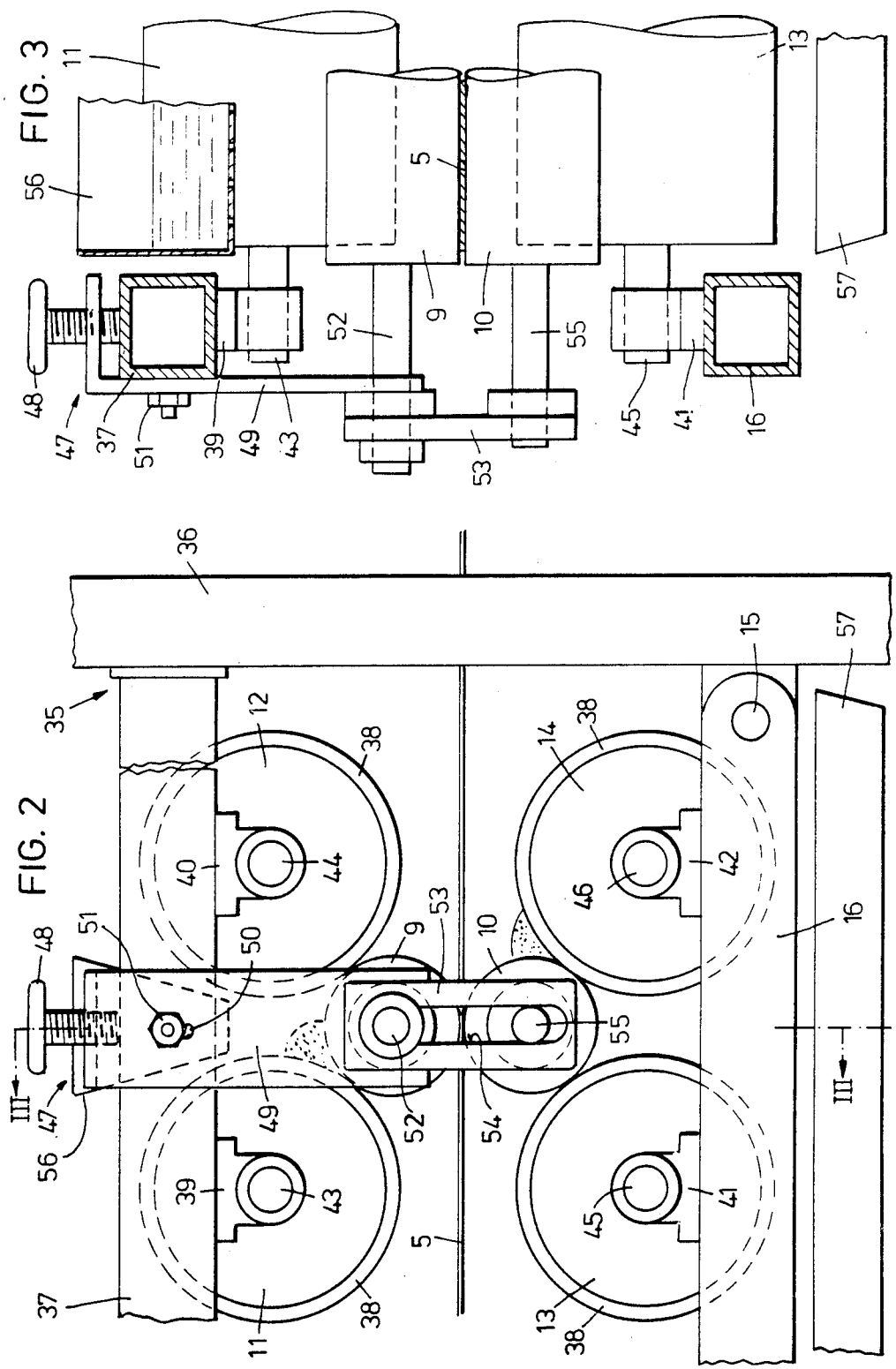

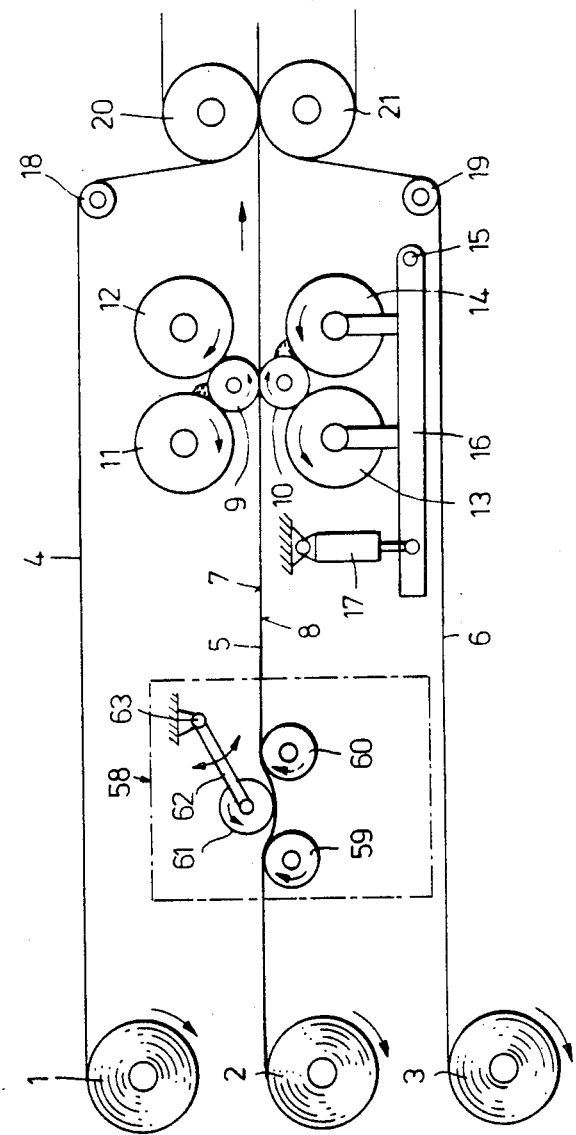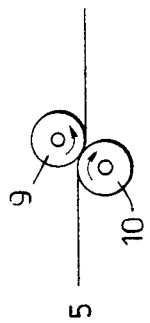

APPARATUS FOR BONDING SHEET MATERIAL

This invention relates to a method of adhesively joining several flexible webs of material and to apparatus for carrying out this method.

Methods and apparatus for affixing two or more webs of paperboard together, or for coating or backing a sheet of paper or paperboard, have already been proposed. In one such process, the adhesive is applied to the surface of a web of paperboard by means of two rolls which can be pressed together with variable pressure. The layer of glue applied is thicker or thinner according to the bearing pressure of the two rolls. The web of paperboard provided with a coating of adhesive is then fed with the web glued thereto between two rolls. This apparatus makes it possible to apply a very fluid adhesive uniformly to the web of paperboard, but not a highly viscous adhesive.

In other previously proposed apparatus, the web of paperboard to be provided with a coating of adhesive is passed between two rolls, the lower roll being immersed in a vat of glue. Excess adhesive is removed by means of a doctor blade from the roll coated with glue. This apparatus has the drawback that if the leading edge of the doctor blade is damaged even slightly, the glue will no longer be applied homogeneously.

The above-mentioned two methods and the respective apparatus are suitable only for applying adhesive on one side.

Apparatus has also been proposed for applying adhesive on both sides by passing the web of paperboard between two rolls, the lower of which is immersed in a vat of glue. In addition, glue is fed between the upper roll and the web for applying adhesive to the upper side. This method is also suitable only for liquid adhesives having low viscosity.

It is an object of this invention to provide a method and apparatus for applying adhesive homogeneously to one or both sides of a flexible web of material, wherein the adhesive applied may be highly viscous. In particular, it should be possible to utilize a water-soluble, natural or synthetic adhesive substance having a solids content of more than 50%.

Furthermore, the multilayered, adhesively joined paperboard should be very smooth.

To this end, in the method according to the present invention for adhesively joining several flexible webs of material, the web to be coated with adhesive is conveyed between two middle rolls having rigid surfaces, pressable against one another and set in rotation, and an application of glue takes place on at least one of the two sides of the web to be coated with adhesive by means of the middle rolls substantially in the region of the generatrices, touching the middle web, of the middle rolls having rigid surfaces, and the webs of material to be adhesively joined to one another are fed through a pressing arrangement.

In the apparatus according to the present invention, for carrying out the foregoing method, there are provided, for applying an adhesive to at least one of the two sides of a web of material to be coated with adhesive, two middle rolls having rigid surfaces, pressable against one another and capable of being set in rotation, and at least one feed means for the adhesive and a pressing arrangement for adhesively joining the webs of material.

One advantage of the method and apparatus according to this invention is that there is no need for a special drying device for the adhesively joined webs of material, so that operation with an optimally low expenditure of energy is possible. Furthermore, a very homogeneous application of adhesive to both sides of the web of material is achieved with this method. Moreover, by using water-soluble adhesive, recycling is also possible. The webs of material, adhesively joined to one another and cut to size, are ready for shipment upon leaving the bonding installation.

Two preferred embodiments of the invention will now be described in detail with reference to the accompanying drawings, in which:

FIG. 2 is a side view of the rolls for applying the adhesive,

FIG. 3 is a section taken on the line III—III of FIG. 2,

FIG. 4 is a diagrammatic representation of part of the apparatus of FIG. 1 with an additional counterbending device, and FIG. 5 is a diagrammatic representation showing the positions of the two middle rolls in another embodiment.

Figure 1:
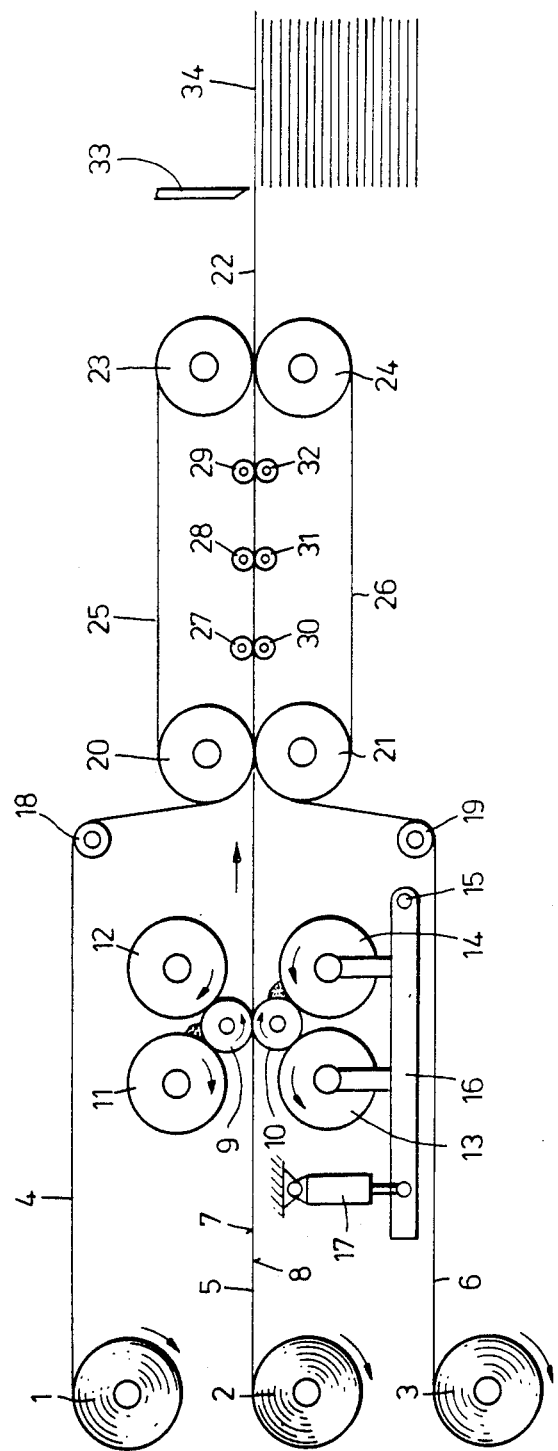
FIG. 1 is a diagrammatic representation of the paperboard bonding apparatus.

The method and apparatus as illustrated in FIG. 1 will now be described. Paperboard webs 4–6 to be adhesively joined to one another are conveyed to the bonding apparatus from supply rolls 1–3. The middle web 5, to be provided on both sides 7 and 8 with a layer of adhesive, e.g., glue, is passed between two steel middle rolls 9 and 10 disposed above and below the middle web 5, respectively. Situated one on each side of both steel rolls 9 and 10 are two rubber-covered lateral rolls 11, 12 and 13, 14. The rolls 9 and 10, driven by a motor (not shown), in turn set the lateral rolls 11–14 in rotation. The rolls 10, 11, and 12 rotate clockwise, the rolls 9, 13, and 14 counterclockwise. The rolls 10, 13, and 14, situated under the middle web 5, are secured to a lever 16 pivotable about an arbor 15. The lever 16 can be raised or lowered by means of a pistoncylinder unit 17 in order to press the two steel rolls 9 and 10 against one another while a middle paperboard web 5 is passing through. The glue is applied to the middle web 5 by the steel rolls 9 and 10, the glue collecting between the upper steel roll 9 and the lateral roll 11 and between the lower steel roll 10 and the lateral roll 14. By means of the steel rolls 9 and 10, glue is applied uniformly to the middle web of paperboard. The two outer webs 4 and 6 to be glued to the middle web 5 are conveyed about upper and lower guide rollers 18 and 19, respectively, and between two rolls 20 and 21, pressed against one another, disposed above and below the middle paperboard web 5. Two rubber sheets 25 and 26, led over pressing rolls 20, 23 and 21, 24, respectively, are provided above and beneath the now three-layered paperboard web 22. The three webs are glued to one another along the path between the two front pressing rolls 20 and 21 and the rear pressing rolls 23 and 24. The rubber sheets 25 and 26 may be pressed against the three-layered paperboard web 22 by additional rolls 27–33.

The glued web 22 is cut into suitable sheets 34 by a diagrammatically illustrated cutting device 33.

The actual glue-applying part of the apparatus is shown in detail in FIG. 2, with only the front roll support 35 being visible. This support consists of an upright 36 with an upper horizontal crossbeam 37 screwed to it laterally and a pivotable lower horizontal beam 16. The upper and lower lateral rolls 11-14, each provided with a rubber covering 38, are connected to the upper and lower crossbeams 37 and 16, respectively, by mountings 39, 40, 41, and 42. The axles 43, 44, 45 and 46 of the lateral rubber-covered rolls 11-14 pass through mountings 39-42. Attached to the upper horizontal crossbeam 37 is a vertical mounting 47 for the two rolls 9 and 10. The height of the mounting 47 can be adjusted by means of a handwheel 48 in that an elongated vertical slot 50 provided on a vertical support 49 of the mounting 47 is displaceable under a mounting screw 51. The upper steel roll 9 is rigidly connected to the vertical support 49. Over the axle 52 of the upper steel roll 9 there is a vertically disposed, rectangular mounting part 53 having an elongated slot 54. The axle 55 of the lower steel roll 10 is mounted in the lower part of the slot 54. The lower steel roll 10 is mounted like a pendulum relative to the upper steel roll 9. In operation, the lower horizontal crossbeam 16 is pivoted upward by the cylinder-piston unit 17 shown in FIG. 1, so that the axle 55 of the lower steel roll 10 slides upward in the elongated slot 54, the lower steel roll 10 being pressed against the upper steel roll 9.

The middle paperboard web 5 to be coated with glue comes in contact with the two steel rolls 9 and 10 practically only in the region of two generatrices, whereupon a very high linear pressure is produced. Thus, the application of glue takes place homogeneously at high pressure.

In the middle above the two upper lateral rolls 11 and 12 there is a glue vat 56 by means of which the glue is distributed uniformly on the upper steel roll 9 and collects along the generatrix of contact between the upper steel roll 9 and the upper lateral roll 11. The high-viscosity adhesive is preferably supplied by means of a geared pump through a pipeline having a glue outlet in the middle of the rolls 10 and 14. The lateral rolls 11-14 bring about a very homogeneous distribution of the adhesive on the two steel rolls 9 and 10. A collecting vat 57 for collecting excess adhesive is provided under the two lower lateral rolls 13 and 14.

The adhesive used is a polymeric synthetic or natural adhesive having a solids content of preferably more than 50%. A dextrin glue is particularly suitable for the optimum accomplishment of the tasks imposed. Since this glue is highly viscous, the necessary high bearing pressure of the steel rolls along substantially only one generatrix is required in order to apply the glue homogeneously to the middle paperboard web on both sides thereof. Through the use of such a high-viscosity glue with a high solids content, drying facilities become superfluous, thus leading to a saving on energy. For example, the adhesive is applied at about 25 g./sq.m., at least one spot of glue being applied per sq.mm.

Instead of adhesively joining three paperboard webs of equal thickness, a middle web of paperboard might equally well be covered on both sides with paper. Furthermore, plastic film or aluminum foil might also be used, in which case at least the middle web or the two outer webs would have to be of a suitable nature to absorb the water contained in the adhesive.

The multilayer cardboard made from the three single webs of paperboard, being about 1.5-4 mm. thick, is particularly suitable for bookbinding purposes. For this application, it is important that the multilayer cardboard lie absolutely flat.

The adhesive used must be water-soluble because of recycling. As a result of the high solids content, the three adhesively joined paperboard webs are already optimally bonded together after leaving the rolls 20-24 with the rubber sheets 25 and 26, so that the sheets 34 cut off by the cutting device are ready for shipment.

For exact purposes of application, it has to be possible to cut the cardboard with an accuracy of one-tenth of a millimeter, so that a homogeneous gluing of the layers is important for this reason as well.

The webs of material 4-6 wound on the supply rolls 1-3 exhibit a tendency to curl in the direction of rolling after a certain storage time. This curling tendency can be eliminated by means of a counter-bending device 58 as shown in FIG. 4. The middle web 5 to be coated with adhesive is led over two cylinders 59 and 60, the spacing between which is preferably about equal to their diameter. A third cylinder 61 is pressed against the middle web 5 from above, by means of a lever arm 62 secured at a pivot point 63, so that a counter-bending pressure is imparted to the middle web of material as it runs through the counter-bending device 58. The amount of pressure exerted upon the middle web 5 by the cylinder 61 between the cylinders 59 and 60 may be greater or less, as need be. The amount of counterbending pressure needed will be apparent from the degree of flatness of the webs after bonding together.

As shown in FIG. 5, one of the two steel rolls 9 or 10 might be laterally offset so that the plane connecting the two axes of rotation of the rolls would not run at right angles to the web 5 of material. By varying the lateral displacement of one of the two rolls 9 and/or 10, the metering of the glue can be controlled and adapted to the material to be coated. In this case, the middle web 5 follows a curved path in the region of the rolls 9 and 10. With this offset arrangement of the middle rolls 9 and 10, the bearing pressure of the two rolls can be less than with the vertical arrangement illustrated in FIGS. 1 and 2, or it may even be dispensed with since bearing pressure is likewise produced between the middle web of material and the rolls owing to the curved course of the web.

With the method priniciple described above, just two webs might be adhesively joined to one another as well, if so desired, in which case the mentioned advantages would likewise be achieved. For this purpose, either the upper or the lower adhesive feed would simply be eliminated, and only one of the two upper or lower supply rolls 1 or 3 would be needed.

What is claimed is:

1. Apparatus for adhesively joining a plurality of flexible webs of material comprising:
   two first rolls having rigid surfaces, capable of being set in rotation and being pressed against one another, for applying an adhesive to one or both sides of a web of material to be coated with adhesive,
   four second rolls having flexible surface coverings, disposed laterally relative to said first rolls and in contact therewith during operation, for homogeneously distributing said adhesive on said first rolls,
   at least one feed means for said adhesive, and
   a pressing arrangement for adhesively joining said webs of material.

2. The apparatus of claim 1, further comprising a pivoting part connected to at least two of said second rolls for pressing said at least two second rolls against said first rolls.

3. The apparatus of claim 1, wherein said pressing arrangement comprises four third rolls and two rubber sheets respectively guided over two each of said third rolls, said sheets being in contact with one another.

4. The apparatus of claim 3, further comprising a plurality of pressing rolls for pressing said rubber sheets against one another.

5. The apparatus of claim 1, further comprising counter-bending means disposed before said first rolls.

6. Apparatus according to any one of the claims 1 or 2 to 5, wherein said first rolls are disposed laterally off-set so that their axes of rotation do not lie vertically above one another.

* * * * *